Figure 1:
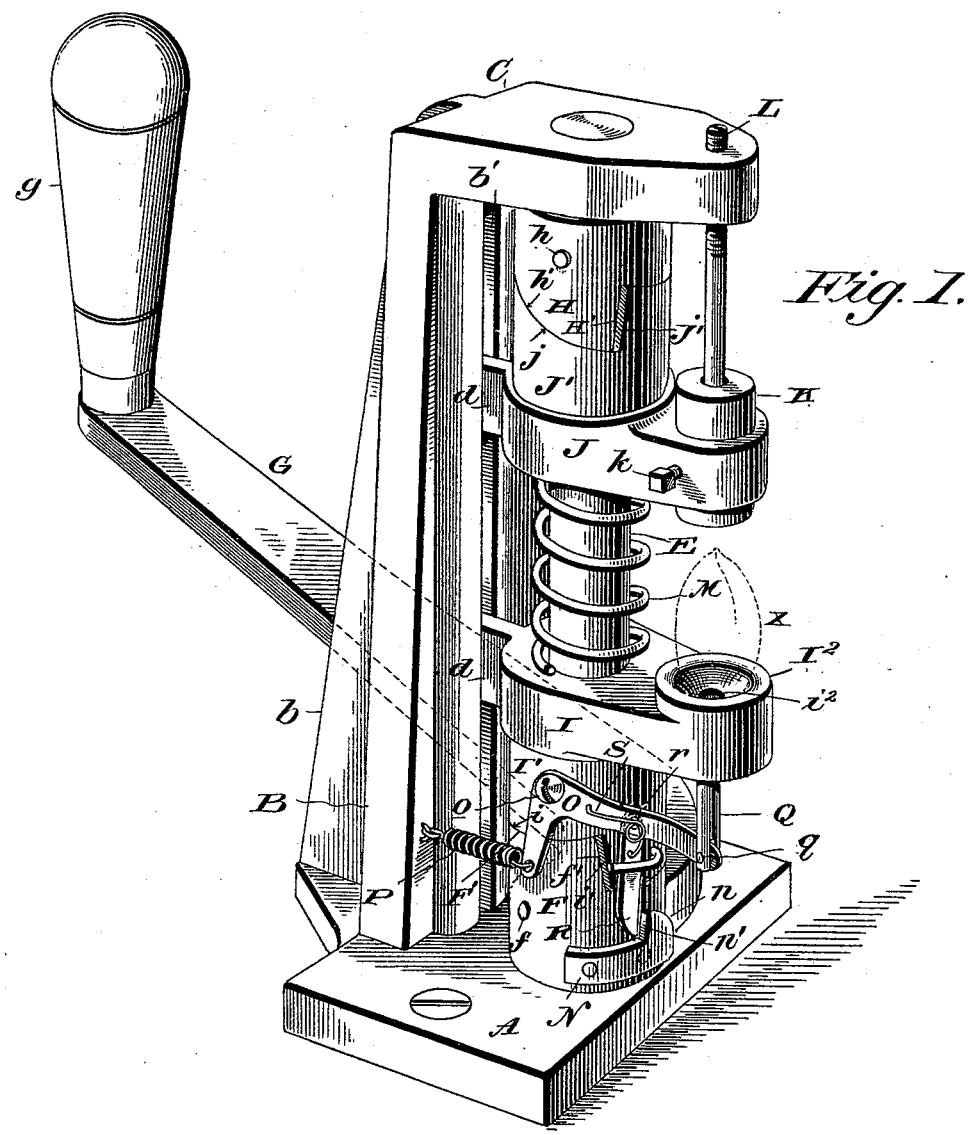

No. 622,262. Patented Apr. 4, 1899.
J. PRADE.
NUT CRACKING DEVICE.
(Application filed Feb. 18, 1898.)

(No Model.) 2 Sheets—Sheet I.

Witnesses
E. E. Masson
Geo. M. Copenhaver

Inventor:
Julian Prade
by L. C. Hills
Attorney

No. 622,262. Patented Apr. 4, 1899.
J. PRADE.
NUT CRACKING DEVICE.
(Application filed Feb. 18, 1898.)

(No Model.) 2 Sheets—Sheet 2.

Witnesses
E. E. Masson
Geo. M. Copenhaver

Inventor:
Julian Prade,
by L. C. Hills
Attorney

UNITED STATES PATENT OFFICE.

JULIAN PRADE, OF WACO, TEXAS.

NUT-CRACKING DEVICE.

SPECIFICATION forming part of Letters Patent No. 622,262, dated April 4, 1899.

Application filed February 18, 1898. Serial No. 670,775. (No model.)

*To all whom it may concern:*

Be it known that I, JULIAN PRADE, a citizen of the United States, residing at Waco, in the county of McLennan and State of Texas, have invented certain new and useful Improvements in Nut-Cracking Devices; and I do hereby declare the following to be a full, clear, and exact description of the invention, such as will enable others skilled in the art to which it appertains to make and use the same.

This invention relates to certain new and useful improvements in nut-cracking devices of that class in which are provided movable jaws between which the nut is held and cracked, pressure being applied by means of a lever actuating the jaw. Heretofore it has been proposed to mount within the jaws spring-actuated plungers, which serve also as means for ejecting the nut after it has been cracked and the pressure on the lever removed.

It is the object of this invention to improve upon such devices, to which end I place the spring between the body portions of the jaws around the upright upon which they work, so that a more staple support is provided for the nut, and thus less force is required to crack the same. I provide a novel form of ejector, which is arranged at one side of the center of the nut-receiving jaw and constructed to be automatically operated as the operating-lever is released after cracking the nut. I dispense with the necessity of the employment of knives and so form the jaws that the nut is received therein in such manner that as pressure is applied the shell will be broken at the center, leaving the meat retained by the end portions of the shell, which can be easily removed, being sufficient, however, to hold the meat integral during the time and after it is ejected from the jaw. I provide a positive cam action directly upon the jaws, so that they are forced together with a force that serves to break the shell between the ends. The jaws are adjustable to adapt them for breaking different-sized nuts.

The device as a whole is compact and composed of few parts, those readily assembled, positive in their action, and not liable to be broken or get out of order.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 2:
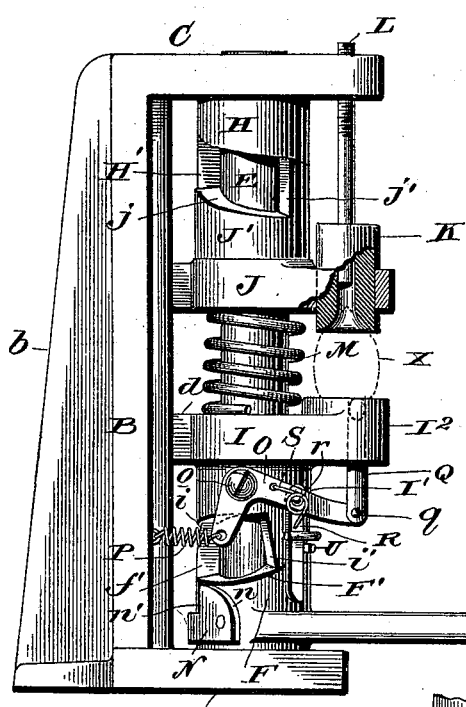
Figure 3:
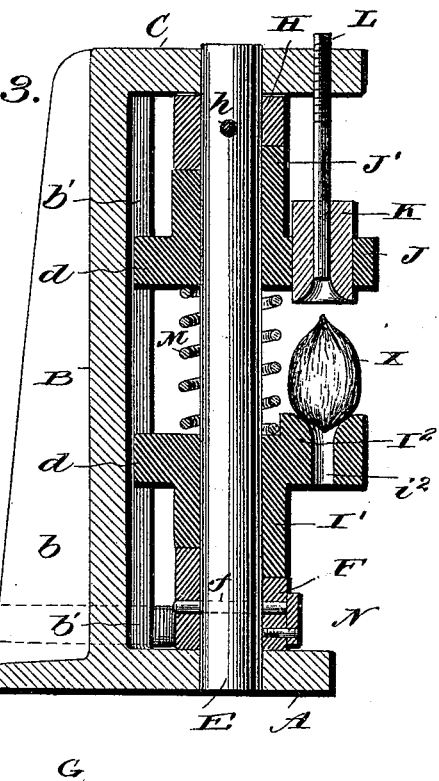
Figure 4:
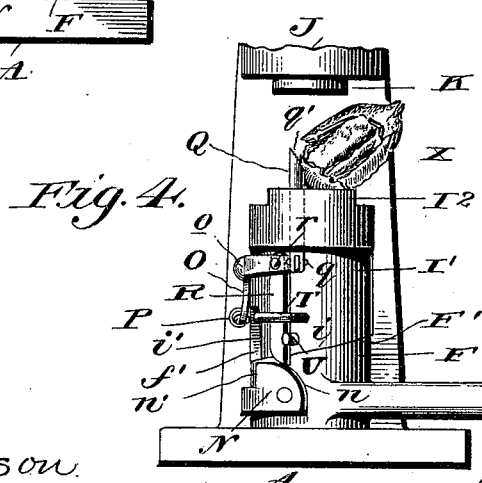

Figure 1 is a perspective view of my improved nut-cracking device in its position of rest ready to receive a nut, which is indicated in position by dotted lines. Fig. 2 is an elevation showing the jaws brought together to crack the nut, which latter is indicated by dotted lines. Fig. 3 is a vertical section through the device, on a smaller scale, with the parts in the same position in which they are shown in Fig. 1. Fig. 4 is a detail in elevation showing the ejector in the position it assumes when ejecting the nut after the latter has been cracked.

Like letters of reference indicate like parts throughout the several views.

Referring now to the details of the drawings by letter, A designates a plate forming the base of the machine. It may be affixed in any desired position by any suitable means, in this instance being shown as secured in place by a screw passed through a hole in the plate, it being designed to provide a number of holes for the reception of a number of screws, so the device may be rigidly fastened in position. Rising from this plate or base is the upright B, braced and strengthened by the web $b$ and terminating at its upper end in the horizontal portion C, the function of which will be readily understood upon reference to Figs. 1, 2, and 3. The inner face of this upright is formed with the guideway $b'$, in which work the lugs $d$ on the body portions of the jaws, as seen best in Fig. 3.

E is a vertical shaft. It is mounted for rotation or partial rotation in the base and the horizontal portion C, and fast thereon near its lower end is the collar F, which may be secured to the shaft in any suitable manner, as by the pin $f$. (Shown in Figs. 1 and 3.) Rigid with this collar is the operating-lever G, which extends horizontally, as shown, and which is designed to have a long sweep or movement, so as to give the necessary movement to the collar. It is provided at its free end with a suitable handle $g$, as shown in Fig. 1.

Secured fast upon the shaft E, near its upper end, is the collar H, in this instance shown as made fast to the shaft by the pin $h$. The under face of this collar is formed with the cam-surface $h'$, as seen best in Fig. 1, and with the stop-shoulder H'. (Seen in Figs. 1 and 2.) The upper face of the collar F is likewise provided with the cam-surface F' and the stop-shoulder $f'$. The object of these cam-surfaces and stop-shoulders will soon be made apparent.

I is the lower jaw. It is sleeved upon the shaft so that the latter may be revolved by the lever, while the jaw does not rotate. This jaw has projecting from its body portion the lug or rib $d$, working in the guideway $b'$ of the upright to hold the jaw against turning, while depending from the body portion is the sleeve or collar I', the under face of which is provided with the cam-surface $i$ and the stop-shoulder $i'$, this cam-surface and stop-shoulder coöperating with the cam-surface and stop-shoulder of the collar F, as shown in the various views. At the end of this jaw is formed the nut-receiving portion $I^2$, having a vertical opening $i^2$ therethrough for the egress of any particles of shell and the upper face being convexed, as shown best in Figs. 2 and 3, this form being deemed important, so that the nut may be best held and have a firm bearing and so that it will not be tilted from its upright position when the jaws are brought together, and as the pressure is brought to bear the end portions of the shell are not broken, but the portion of the shell between the ends is crushed, as seen in Fig. 4.

J is the upper jaw. Its body portion has the lug or rib $d$, which works in the guideway of the upright, as shown, and this body portion is also provided with the collar J', which is loosely sleeved upon the shaft E, and its upper face is provided with the cam-surface $j$ and stop-shoulder $j'$, which coöperate with the cam-surface and stop-shoulder of the collar H, as will soon appear.

K is the upper nut-receiving portion. It is adjustably held in the end of the upper jaw, being designed to be held in its adjusted position by suitable means, as the set-screw $k$. Its lower face is provided with a convex formation similar to that of the lower jaw, as seen best in Figs. 2 and 3.

L is a rod adjustably mounted in the horizontal portion C at the upper end of the upright and extending down within the part K, as seen in Figs. 1, 2, and 3, being designed to be adjusted as the part K is adjusted, so that its lower end shall at all times assume the same relative position to the mouth of the part K. When the jaws return to their normal position after having cracked the nut, this rod serves to force from the part K the nut or any portion thereof that might perchance be held therein.

M is a stout spring surrounding the shaft E between the two jaws, its normal tendency being to separate the jaws, but being compressed as the lever is operated to bring the jaws together to crack the nut.

Fastened to the outer face of the collar F is the plate N, having a cam-surface $n$ upon its upper face, as seen clearly in Figs. 1, 2, and 4, and a vertical shoulder $n'$. (Seen also in the same views.)

O is a bell-crank lever pivotally mounted on the collar I' of the lower jaw, as seen at $o$. P is a spring having one end connected to the lower end of the vertical arm of this lever and its other end to the upright B. To the outer end of the horizontal arm of this lever is pivotally connected, as at $q$, the lower end of the ejector Q, the said lower end being bifurcated, as seen best in Fig. 1, to receive the end of the arm of the lever. This ejector works vertically through an opening in the part $I^2$ to one side of the center, so that the opening $i^2$ is at all times left free and unobstructed for the passage of any pieces of shell, and the upper end of this ejector is preferably beveled and serrated, as seen at $q'$ in Fig. 4, so that when in its normal position it coincides with the bevel of the mouth of the part $I^2$ directly under the nut.

R is an arm pendent from the horizontal arm of the bell-crank lever, being pivotally connected therewith, as at $r$, and having its lower end rounded, as seen in Figs. 1, 2, and 4. S is a spring having one end connected to this arm near its pivot and the other end connected with the horizontal arm of the bell-crank lever, as seen best in Fig. 1, its function being to normally hold the arm R in its vertical position.

T is a guide for the arm R, and U is a stop to limit its movement in one direction.

With the parts constructed and arranged substantially as above described the operation will be readily understood and, briefly stated, is as follows: The normal position of the parts is that illustrated in Fig. 1. While in such position the nut (indicated at X in dotted lines) is placed in the lower nut-receiving portion $I^2$, and then the operating-lever is thrown around, so that the opposing cam-surfaces at the top and bottom ride upon each other, thus bringing the two jaws toward each other and compressing the spring and cracking the nut. During this movement of the parts the pendent arm R is forced against the tension of its spring S, and by engagement therewith of the shoulder $n'$ of the plate N the said arm assumes the position shown in Fig. 2 when the nut is cracked. Now when pressure is released from the operating-lever and it is brought back to its normal position the spring M, assisting the rounded end of the arm R, rides up on the cam-face $n$ of the plate N and the ejecter is forced upward, as seen in Fig. 4, and the nut ejected from the lower jaw. As seen in said Fig. 4, the end portions of the shell are not separated from the meat; but the central portion of the shell is crushed, so that it separates from the meat, which latter is held against separation by the end portions, so that as the nut is ejected it still holds together; but the end portions can be easily removed without breaking the meat. As the operating-lever returns to its normal position the arm R drops into the position in which it is shown in Fig. 1 and the ejector drops to its normal position and the device is ready to receive another nut, when the operation is repeated.

Modifications in detail may be resorted to without departing from the spirit of the invention or sacrificing any of its advantages.

What I claim as new is—

1. In a nut-cracking machine, the combination with oppositely-movable jaws having guide-ribs and cam-surfaces and stop-shoulders, of a rotatable shaft and collars fast thereon and having cam-surfaces and stop-shoulders coacting with those of the jaws, substantially as described.

2. In a nut-cracking machine, the combination with oppositely-movable jaws having guide-ribs and cam-surfaces and stop-shoulders, of a rotatable shaft and collars fast thereon and having cam-surfaces coacting with those of the jaws, and a spring around said shaft between the jaws and bearing against the adjacent faces thereof, as set forth.

3. In a nut-cracking machine, the combination of oppositely-movable jaws, a rotatable shaft, a lever fast thereon, positive cam-contacting surfaces for moving the jaws, an ejector actuated by the movement of one of said jaws, and a spring disposed between the jaws, as shown and described.

4. In a nut-cracking machine, the combination with oppositely-movable jaws having cam-surfaces and a rotatable shaft with collars fast thereon and provided with cam-surfaces, of an ejector carried a bell-crank lever pivotally supported by one of the jaws, as set forth.

5. In a nut-cracking machine, a nut-holding portion having a vertical opening therethrough and an ejector working through an opening eccentric to the central opening, as set forth.

6. In a nut-cracking machine, the combination with a nut-holding part having a vertical opening therethrough, of an ejector mounted to work vertically through said part eccentric to the opening therethrough and means movable with said part and carrying the ejector, as set forth.

7. In a nut-cracking machine, the combination with the lower jaw and the lower collar formed with engaging cam-surfaces, of a bell-crank lever pivotally supported by the lower jaw, an ejector carried by said lever, and a trip-arm also carried by said jaw, as shown and described.

8. In a nut-cracking machine, the combination with the oppositely-movable jaws with cam-surfaces, of the rotatable shaft, collars fast on said shaft and having cam-surfaces, and an adjustable nut-holding part adjustably mounted in one of said jaws and an ejector pivotally supported on the lower jaw, as set forth.

9. In a nut-cracking machine, the combination with the base and the upright with its horizontal portion, of the shaft rotatably mounted in the base and horizontal portion, collars fast on said shaft near its ends and having cam-surfaces upon their adjacent faces, and jaws loosely sleeved upon the shaft and having cam-surfaces upon their outer faces and an ejector pivotally supported on the lower jaw, as shown and described.

10. In a nut-cracking machine, the combination of the base, the upright with its horizontal portion, the shaft rotatably mounted in said base and horizontal portion, collars fast on the shaft and having cam-surfaces, the jaws loose upon the shaft and having cooperating cam-surfaces, an ejector pivotally supported on the lower jaw and a spring around the shaft between the jaws, substantially as and for the purpose specified.

11. In a nut-cracking machine, a jaw having a guide-rib and a nut-holding portion having concentric and eccentric passages therethrough and a collar with cam-surface, as set forth.

12. In a nut-cracking machine, a jaw having a guide-rib, a collar with cam-surface and a nut-holding portion having a depression the wall of which has a convex upper face, and a vertical passage eccentric to a passage through the said portion for the reciprocation of an ejector, and an ejector, as set forth.

13. In a nut-cracking machine, a jaw having a collar with cam-surface and a nut-holding portion having a central vertical passage and a vertical passage eccentric therewith and an ejector movable in said eccentric passage, substantially as and for the purpose specified.

14. In a nut-cracking machine, the combination with the shaft and a collar fast thereon and provided with a plate with cam-surface and vertical shoulder, of a bell-crank lever, an ejector carried thereby, a vertical trip-arm with rounded lower end, and a spring connecting said arm with the horizontal arm of the bell-crank lever, substantially as shown and described.

In testimony whereof I affix my signature in presence of two witnesses.

JULIAN PRADE.

Witnesses:
F. M. MILLER,
SHAPLEY P. ROSS.